(12) United States Patent
Droux et al.

(10) Patent No.: US 7,631,182 B1
(45) Date of Patent: Dec. 8, 2009

(54) SECURE PROTOCOL HANDSHAKE OFFLOAD USING TNICS

(75) Inventors: Nicolas G. Droux, San Jose, CA (US); Sunay Tripathi, San Jose, CA (US); Hsiao-Keng Jerry Chu, Palo Alto, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 715 days.

(21) Appl. No.: 11/165,990

(22) Filed: Jun. 24, 2005

(51) Int. Cl.
*H04L 29/06* (2006.01)
(52) U.S. Cl. ...................... 713/151; 713/164
(58) Field of Classification Search .......... 713/151–154
See application file for complete search history.

(56) References Cited

U.S. PATENT DOCUMENTS

| | | | |
|---|---|---|---|
| 6,801,927 B1 * | 10/2004 | Smith et al. | 709/202 |
| 6,941,386 B2 * | 9/2005 | Craft et al. | 709/250 |
| 6,993,644 B2 * | 1/2006 | Anand et al. | 713/1 |
| 7,124,293 B2 * | 10/2006 | Mualem et al. | 713/151 |
| 2004/0250059 A1 * | 12/2004 | Ramelson et al. | 713/150 |

* cited by examiner

*Primary Examiner*—Kambiz Zand
*Assistant Examiner*—Amare Tabor
(74) *Attorney, Agent, or Firm*—Osha • Liang LLP

(57) ABSTRACT

A method for offloading a secure protocol handshake. The method includes establishing a connection between a host system and a remote peer, and determining whether the secure protocol handshake is offloaded to a network interface card (NIC). When the secure protocol handshake is offloaded to the NIC, an offload request is sent to offload the secure protocol handshake, where the offload request includes a value of at least one cryptographic key. The method further includes performing cryptographic operations associated with the secure protocol handshake using the value of at least one cryptographic key to obtain at least one secret key, and returning a status of the secure protocol handshake to the host system.

18 Claims, 4 Drawing Sheets

US 7,631,182 B1

SECURE PROTOCOL HANDSHAKE OFFLOAD USING TNICS

CROSS REFERENCE TO RELATED APPLICATIONS

The present application contains subject matter that may be related to the subject matter of the application with U.S. application Ser. No. 10/884,791 entitled "Fast Connection Offload", filed on Jul. 1, 2004, and assigned to the assignee of the present application, and U.S. Application entitled "Cryptographic Offload Using TNICs" with U.S. application Ser. No. 11/645,870 filed on Jun. 24, 2005.

BACKGROUND

Conventionally employed computer systems commonly use both a Transmission Control Protocol (TCP) and an Internet Protocol (IP) processing layer to facilitate the transmission and receipt of data over a network system. Further, Network Interface Cards (NICs) are commonly used to enable computers to connect to a network. With the steadily increasing volume and rates of data transfer, processing at the TCP/IP layers can burden a system. To address this issue, network interface cards (NICs) have been designed that are capable of processing TCP protocol in hardware (i.e., TNICs). Using TNICs, the processing of message streams can be offloaded onto the TCP/IP layers of the TNIC, resulting in a reduced processing burden on the CPU of a system.

When secure data is exchanged over a network system, secure protocols, such as Secure Sockets Layer (SSL) and Transport Layer Security (TLS), are used to secure web traffic. SSL and TLS make extensive use of encryption to secure the traffic exchanged between two peers in a network system. Communication through SSL/TLS can be divided into two phases: a handshake phase followed by a data transfer phase. During the handshake phase, one peer authenticates with the other peer and exchanges cryptographic keys using public-key cryptography. The messages exchanged between peers during the handshake phase generate overhead such as system calls, input/output traffic across the host bus, interrupts, etc. During the data exchange phase, the peers use the keys to encrypt the traffic to be exchanged between them.

Cryptographic operations performed during the handshake phase using public and private keys are typically compute intensive operations. In order to alleviate the host from performing such operations, cryptographic hardware accelerators are often used to perform cryptographic operations. Typically, cryptographic hardware accelerators are implemented using a proxy or an accelerator card. If a proxy is used, the proxy performs both the SSL/TLS processing as well as the cryptographic processing. Specifically, the proxy communicates with the remote hosts using the SSL/TLS protocols on one side, and the hosts with non-encrypted traffic on the other side. The proxy implements a TCP/IP stack, SSL/TLS functionality, as well as cryptographic hardware capabilities. A proxy can be implemented as a standalone machine, part of a router or switch, or as a add-on card that plugs into a host computer. In a proxy implementation of a cryptographic hardware accelerator, the information carried as part of the original SSL/TLS data becomes unavailable upon reaching the host software that acts on the non-encrypted traffic.

Alternatively, an accelerator card is an add-on card that plugs into a host computer through an input/output bus (e.g., PCI bus). The SSL/TLS protocol is implemented by the software running on the host computer, and the cryptographic operations are performed in hardware by the accelerator card. The software component that implements the SSL/TLS protocol typically invokes the cryptographic hardware using e.g., a library, a framework, etc. Because the host software implements the SSL/TLS protocols when using an accelerator card, the SSL/TLS data crosses the IO bus several times during the key exchange portion of the handshake phase.

SUMMARY

In general, in one aspect, the invention relates to a method for offloading a secure protocol handshake, comprising establishing a connection between a host system and a remote peer, determining whether the secure protocol handshake is offloaded to a network interface card (NIC), if the secure protocol handshake is offloaded to the NIC sending an offload request to offload the secure protocol handshake, wherein the offload request comprises a value of at least one cryptographic key, performing cryptographic operations associated with the secure protocol handshake using the value of at least one cryptographic key to obtain at least one secret key, and returning a status of the secure protocol handshake to the host system.

In general, in one aspect, the invention relates to a system for offloading a secure protocol handshake, comprising a host configured to determine whether the secure protocol handshake is offloaded to a network interface card (NIC), and if the secure protocol handshake is offloaded to the NIC send an offload request to offload the secure protocol handshake to a NIC, wherein the offload request comprises a value of at least one cryptographic key, and the NIC configured to perform the secure protocol handshake using the value of the at least one cryptographic key, wherein the secure protocol handshake results in establishing at least one secret key.

In general, in one aspect, the invention relates to a computer system for offloading a secure protocol handshake, comprising a processor, a memory, a storage device, and software instructions stored in the memory for enabling the computer system under control of the processor, to establish a connection between a host system and a remote peer, determine whether the secure protocol handshake is offloaded to a network interface card (NIC), if the secure protocol handshake is offloaded to the NIC send an offload request to offload the secure protocol handshake, wherein the offload request comprises a value of at least one cryptographic key, perform cryptographic operations associated with the secure protocol handshake using the value of at least one cryptographic key to obtain at least one secret key, return a status of the secure protocol handshake to the host system.

Other aspects of the invention will be apparent from the following description and the appended claims.

DETAILED DESCRIPTION

Figure 1A:
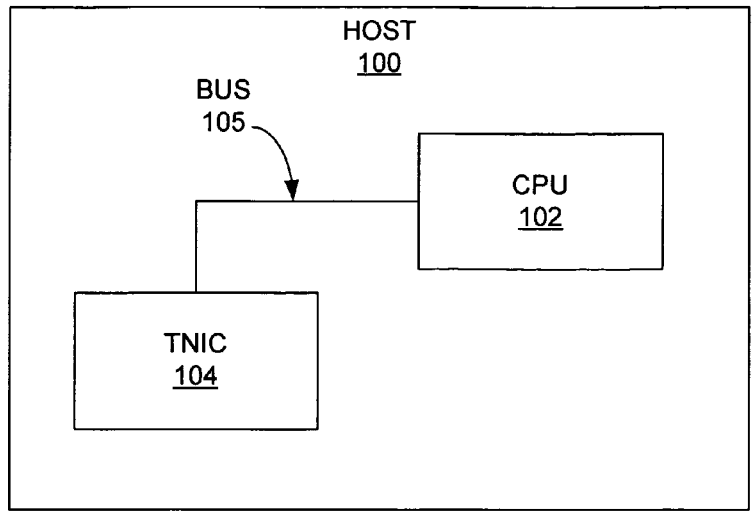
FIG. 1A shows a host system in accordance with one embodiment of the invention.

Specific embodiments of the invention will now be described in detail with reference to the accompanying figures. Like elements in the various figures are denoted by like reference numerals for consistency. Further, the use of "ST" in the drawings is equivalent to the use of "Step" in the detailed description below.

In the following detailed description of embodiments of the invention, numerous specific details are set forth in order to provide a more thorough understanding of the invention. In other instances, well-known features have not been described in detail to avoid obscuring the invention.

In general, embodiments of the invention relate to offloading a secure protocol handshake phase to a Network Interface Card (NIC). Specifically, embodiments of the invention relate to selectively offloading secure protocol handshakes, while still allowing the host software components to access the secure protocol data, where the host system determines whether to offload a particular secure protocol handshake based on capabilities of the NIC.

FIG. 1A shows a system for offloading secure protocol processing to NICs in accordance with one embodiment of the invention. Specifically, the system of FIG. 1A shows a host (100) system including a CPU (102) and a TNIC (104) connected via a bus (105). While FIG. 1A and the remainder of this disclosure discuss the invention with respect to a specific type of NIC (i.e., TNIC), those skilled in the art will appreciate that the invention may be performed using any type of NIC. The system of FIG. 1A is used to perform offloading of a secure protocol connection from the host (100) to the TNIC (104). Those skilled in the art will appreciate that although FIG. 1A only shows one TNIC (104) in the host (100), several TNICs may exist in the host (100), depending on the needs of the host (100).

The host (100) may be any computer system capable of exchanging data with a remote peer. Further, the host (100) may include one or more applications (not shown) (e.g., e-commerce applications) that use a secure protocol to transfer data between the host (100) and one or more remote peers (i.e., computer systems operating remotely over a network) (not shown). The host applications may be running in kernel space or user space.

The CPU (102) includes a TCP/IP stack operating in a system kernel (not shown). Further, the CPU interfaces with the TNIC (104), which receives messages (i.e., packets) from a network (e.g., the Internet, etc.). When the TNIC (104) receives packets from the network, the packets are processed and forwarded to the host (100). In one embodiment of the invention, the TNIC (104) includes a network stack with a TCP layer and an IP layer configured to enable processing of data sent to and received from remote peers. Thus, when the host (100) establishes a TCP connection with one or more remote peers, rather than the host (100) performing TCP/IP processing of packets sent and received, the TNIC (104) provides this processing functionality via the TCP/IP stack implemented on the TNIC (104).

As noted above, the system of FIG. 1A is used to offload secure protocol connections from the host (100) to the TNIC (104). In one embodiment of the invention, the host (100) includes functionality to conduct fast offloading of a connection onto the TNIC (104). Specifically, upon establishing a TCP connection between the host (100) and the remote peer (e.g., by using a handshake procedure to authenticate both ends of the TCP connection), the kernel sends unacknowledged and unsent data from the host (100) to the TNIC (104) (i.e., the TNIC driver (not shown)) as part of the process for initiating an offload to the TNIC. In this manner, the TNIC (104) immediately begins accepting and processing message packets (sent by the remote peer) from the TCP connection before the offload is completely set up (i.e., before the kernel has completed offloading the connection to the TNIC). Additionally, message packets are sent to the remote peer by the TNIC (104) without waiting for the offload process to be completed. Thus, data transmission is occurring simultaneously with the offload set-up process.

Figure 1B:
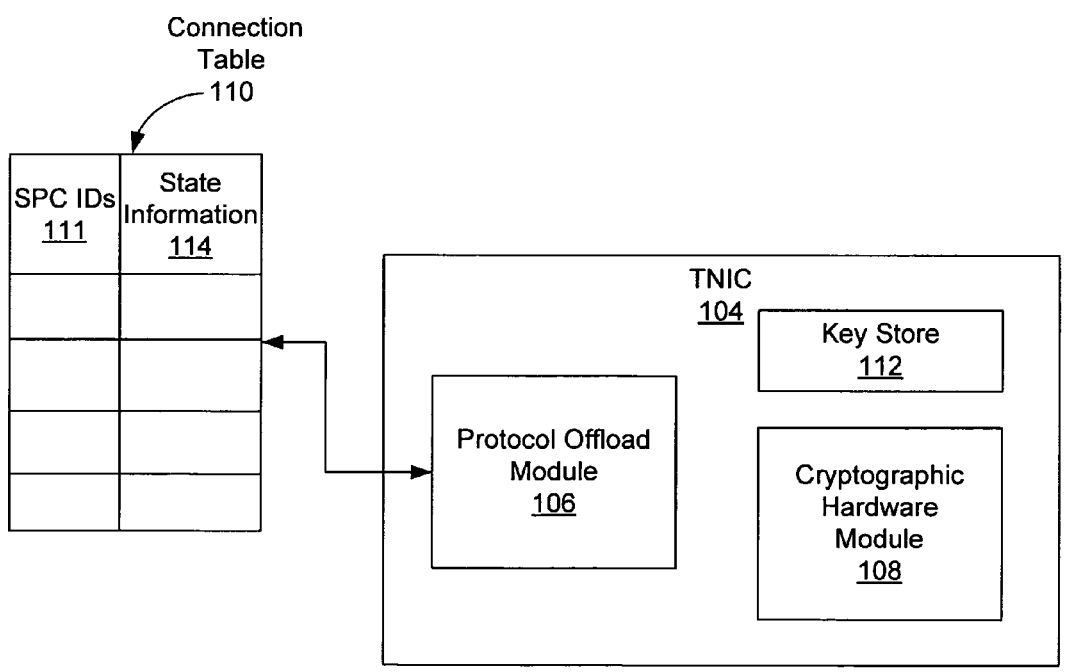
FIG. 1B shows a Transport Network Interface Card (TNIC) in accordance with one embodiment of the invention.

FIG. 1B shows the TNIC (104) in accordance with one embodiment of the invention. In one embodiment of the invention, the TNIC (104) includes a protocol offload module (106), a cryptographic hardware module (108), and a key store (112). The protocol offload module (106) includes functionality to process a protocol connection, such as a TCP connection. In one embodiment of the invention, the protocol offload module (106) also includes functionality to process a secure protocol connection, such as an SSL connection, TLS connection, etc. Specifically, when a packet is transmitted or received by the host (100), the protocol offload module (106) determines which protocol the packet is associated with using a connection table (110). In one embodiment of the invention, the connection table (110) maps secure protocol connection identifications (i.e., SPC IDs (111)) (e.g., the name of the secure protocol connection, port numbers for the secure protocol connection, a secure protocol ID, etc.) with state information (114) associated with the secure protocol connection. In one embodiment of the invention, state information may include a listing of packets in the message stream that have/have not been sent to the remote peer, references or names of cryptographic keys to be used in cryptographic operations for secure protocol connection data, the cryptographic keys themselves, etc. The connection table (110) is populated by the TNIC when a secure protocol connection is offloaded. Those skilled in the art will appreciate that the connection table (110) may be any data structure and is not limited to a table as shown in FIG. 1B.

In one embodiment of the invention, the protocol offload module (106) examines the header information of each transmitted or received packet to obtain a port number and a connection number, and subsequently uses the port number and the connection number to index into the connection table (110) to determine which protocol the packet is associated with. For example, if the protocol is associated with a TCP connection, and the protocol offload module (106) includes capability to process a TCP connection, then the protocol offload module (106) processes the packet based on this information. Alternatively, if the packet is associated with a secure protocol connection, then the protocol module (106) processes the packet (i.e., determines the data on which cryptographic operations are to be performed) and forwards the packet to the cryptographic hardware module (108) on the TNIC, which is capable of performing cryptographic operations on transmitted or received data. In one embodiment of the invention, cryptographic operations performed on the packet data may include encrypting data to be sent over the network, decrypting data received from a remote peer, etc. In one embodiment of the invention, the protocol offload module (106) includes functionality to recognize which algorithms to use for the type of secure protocol connection determined. Those skilled in the art will appreciate that the connection table (110) may be stored within the protocol offload module (106), or may be located elsewhere within the TNIC (104) accessible by the protocol offload module (106). Further, the connection table (110) may include both secure and non-secure protocol connection information. Alternatively, in one embodiment of the invention, multiple connection tables may exist for different protocols handled by the TNIC.

In one embodiment of the invention, the cryptographic hardware module (108) includes cryptographic algorithms for encrypting/decrypting network traffic. Upon receiving packets from the protocol offload module (106), the cryptographic hardware module (108) uses cryptographic algorithms and symmetric cryptographic keys (i.e., secret keys) to perform cryptographic operations on secure protocol data. In one embodiment of the invention, the symmetric keys used by the cryptographic hardware module (108) may be stored on the TNIC (104) in a key store (112). In one embodiment of the invention, the key store may include a table of cryptographic keys (not shown). The table of cryptographic keys may be used by the cryptographic hardware module (108) to look up which cryptographic key to use to encrypt/decrypt secure protocol data. In this case, the host (100), when requesting the TNIC (104) to offload a secure protocol connection, may provide the TNIC (104) with a reference to value to a cryptographic key. The cryptographic hardware module (108) may then use the reference/value to index into the table of cryptographic keys to find the key to be used for a particular cryptographic operation.

Those skilled in the art will appreciate that embodiments of the invention may be performed with a network interface card (NIC) that does not include a TCP/IP stack. Specifically, a secure protocol connection may be offloaded to a NIC (rather than a TNIC), where the NIC includes a protocol offload module capable of processing packets sent/received using secure protocols but not TCP/IP connections, and cryptographic hardware to perform cryptographic operations.

Figure 2:
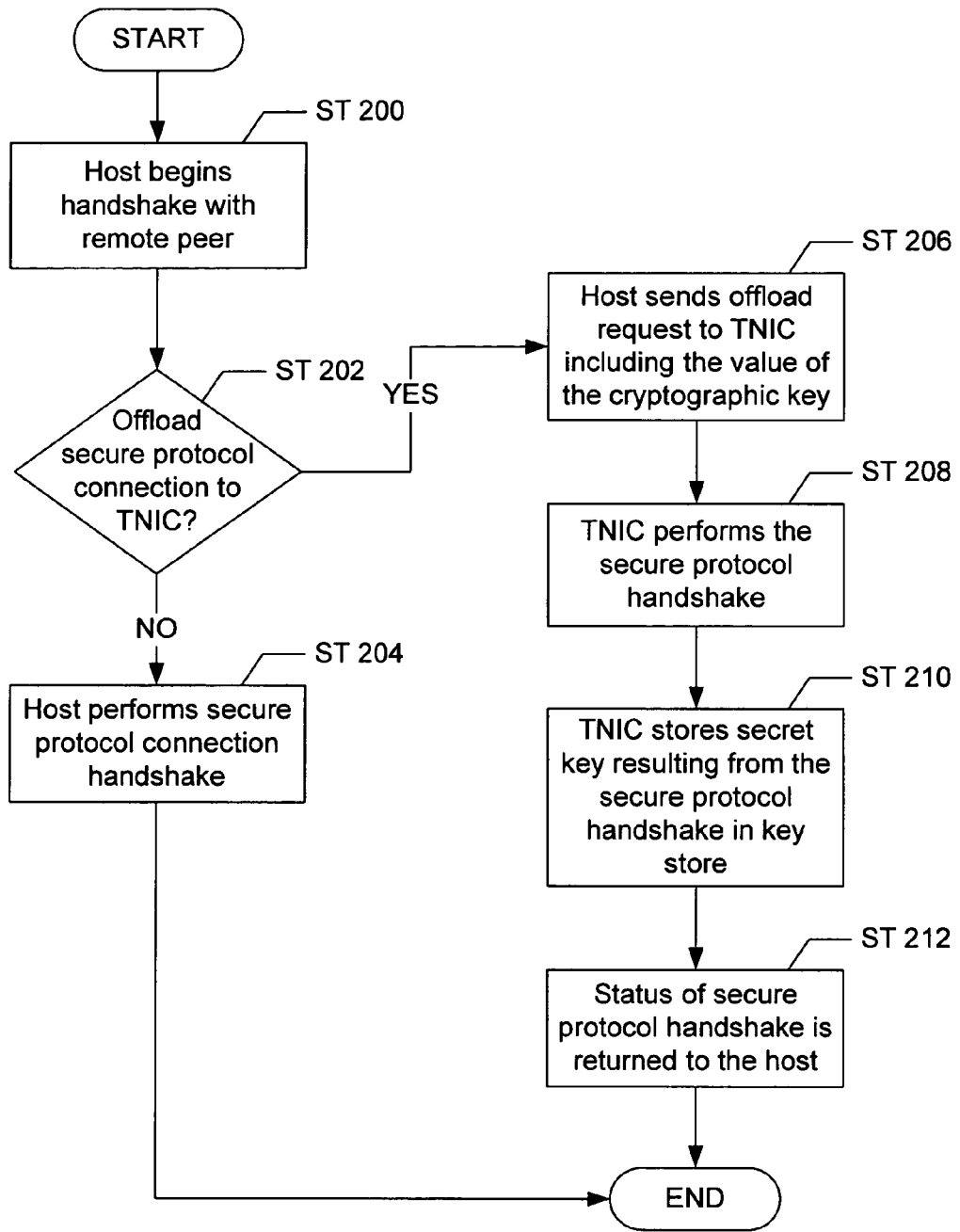
FIG. 2 shows a flow chart for offloading a secure protocol handshake in accordance with one embodiment of the invention.

FIG. 2 shows a flow chart for offloading a secure protocol connection handshake in accordance with one embodiment of the invention. Initially, the host begins a handshake with a remote peer to begin establishing a secure connection with the remote peer (Step 200). Those skilled in the art will appreciate that the secure protocol handshake is performed using methods well known in the art. Further, those skilled in the art will appreciate that both parties (i.e., the host and the remote peer) have access to the cryptographic keys needed to perform the secure protocol handshake. For example, the remote peer (i.e., the client) has the public key of the host, and uses the host's public key to encrypt data sent to the host, which the host then decrypts using its own private key.

Continuing with FIG. 2, subsequently, a determination is made whether to offload the secure protocol connection to the TNIC (Step 202). In one embodiment of the invention, the determination as to whether to offload the secure protocol connection to the TNIC may depend on whether the TNIC is capable of handling the secure protocol connection. For example, the host may analyze the message stream exchanged during the initial portion of the secure protocol handshake to determine whether the message stream is suitable for offload to the TNIC. If the secure protocol connection is not offloaded to the TNIC, then the host completes the handshake procedure with the remote peer (Step 204), including the key exchange phase that results in a secret key used during the data transfer phase of the secure protocol connection to perform bulk encryption.

Alternatively, if the secure protocol connection is offloaded to the TNIC, then the host sends an offload request to the TNIC (Step 206). Specifically, the host application sends an offload request to the host's TCP stack, which indicates to the TCP stack to offload the secure protocol handshake. In one embodiment of the invention, the offload request includes the value of the cryptographic key(s) needed by the TNIC to complete the secure protocol handshake. In one embodiment of the invention, the cryptographic key(s) are asymmetric cryptographic key(s) used to perform the key exchange phase of the secure protocol handshake. Further, the asymmetric keys may already be pre-programmed into the TNIC, in which case the value of the cryptographic key(s) passed to the TNIC in the offload request are used to look up the asymmetric keys needed by the TNIC. In one embodiment of the invention, the asymmetric keys may be stored in the key store (112 in FIG. 1B) of the TNIC. Alternatively, the host may provide the asymmetric keys to the TNIC in the offload request.

Subsequently, the TNIC completes the secure protocol handshake with the remote peer (Step 208). The key exchange phase of the secure protocol handshake results in the establishment of one or more secret keys, which are used during the data transfer phase of the secure protocol connection (described below in FIG. 3). In one embodiment of the invention, the TNIC stores the secret keys in the key store (Step 210) and, if the data transfers phase of the secure protocol connection is also offloaded to the TNIC, the TNIC already has available the secret keys required to perform cryptographic operations on the secure protocol data. Finally, the TNIC sends the status of the secure protocol handshake to the host (i.e., host application) (Step 212). Specifically, the status may indicate that the handshake completed successfully, failed, etc.

At this stage, the handshake phase of the secure protocol connection is complete. In one embodiment of the invention, if the handshake between the host and the remote peer completes successfully, then the host determines whether the data transfer phase of the secure protocol connection is also offloaded to the TNIC. If the TNIC is capable of handling the offload request, then the data transfer phase of the secure protocol connection begins. Those skilled in the art will appreciate that if the data transfer phase is not offloaded to the TNIC, then the TNIC may provide the host with the secret key(s) resulting from the handshake phase of the secure protocol connection and the host may perform the data transfer phase of the secure protocol connection.

Figure 3:
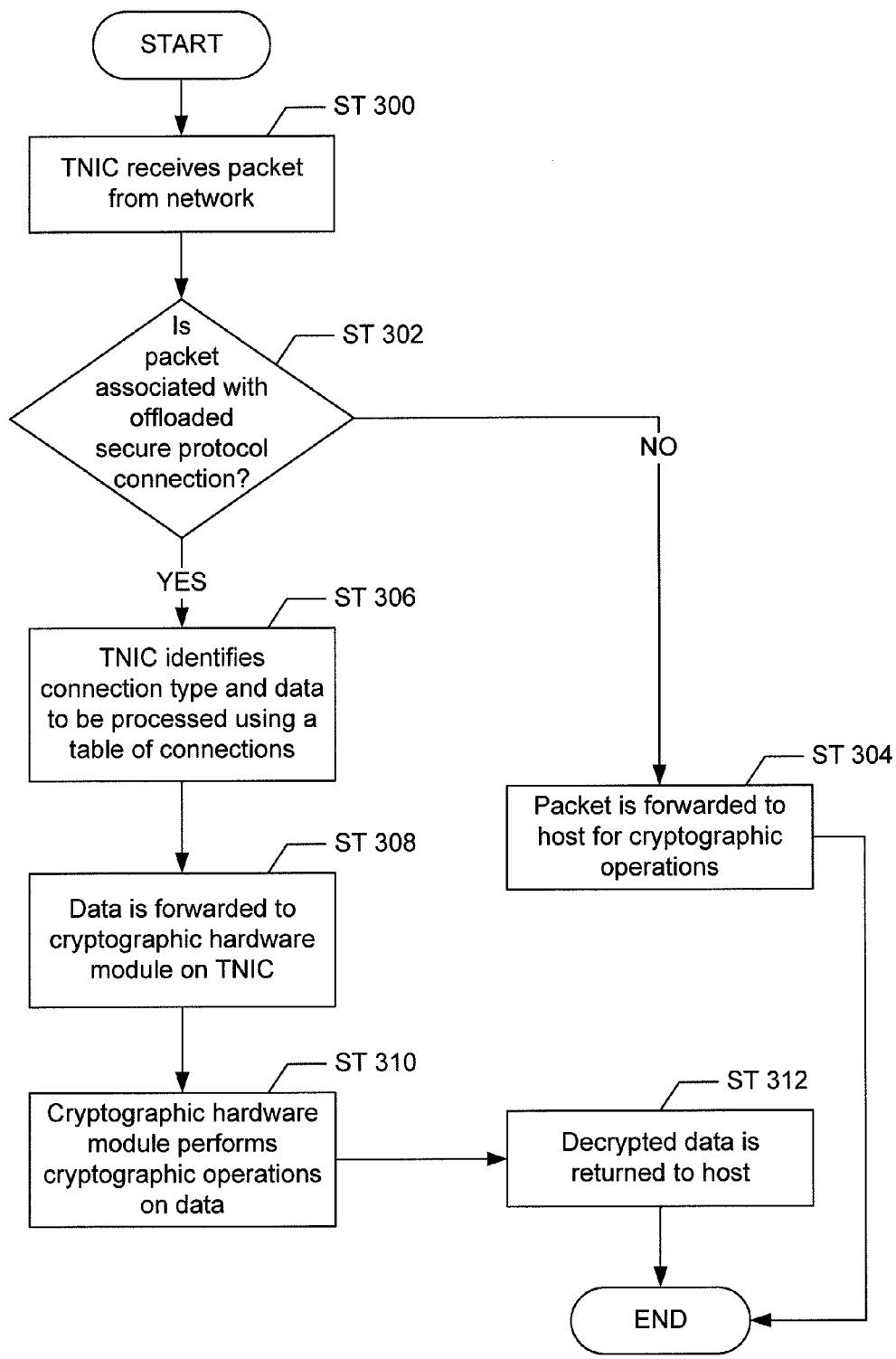
FIG. 3 shows a flow chart for performing the data transfer phase of a secure protocol connection offloaded to the TNIC in accordance with one embodiment of the invention

FIG. 3 shows a flow chart for performing the data transfer phase of a secure protocol connection offloaded to the TNIC in accordance with one embodiment of the invention. Initially, the TNIC receives a packet from the network (Step 300). Subsequently, a determination is made whether the received packet is associated with an offloaded secure protocol connection (Step 302). In one embodiment of the invention, the received packet is examined to determine if the protocol used is in fact encrypted using a secure protocol. For example, the header associated with the received packet may be examined to determine whether the data is encrypted using a secure protocol. Further, a connection table (such as 110 in FIG. 1B) may be used to determine whether the secure protocol associated with the received packet is also a secure protocol that has been offloaded to the TNIC. For example, state information associated with the secure protocol connection of the received packet may be used to determine if the secure protocol connection is one that the TNIC is handling.

Continuing with FIG. 3, if the received packet is not associated with an offloaded secure protocol connection that is to be handled by the TNIC, then the received packet is forwarded on to the host, and the host performs the necessary cryptographic operations to encrypt/decrypt data (Step 304). Alternatively, in one embodiment of the invention, if the received packet is associated with an offloaded secure protocol connection, then the TNIC uses the connection table to identify the type of connection (Step 306). Specifically, the TNIC reads header information associated with the received packet to determine a connection number and/or a port number, which is then used as an index into the table of connection to determine the type of secure protocol connection associated with the received packet. In one embodiment of the invention, the secure protocol connection may be an SSL connection, TLS connection, etc. Those skilled in the art will appreciate that the TNIC may detect a TCP connection first, and then determine that the connection is also a secure protocol connection, such as an SSL connection.

Upon determining the type of secure protocol connection, the TNIC determines which data is to be processed (i.e., the data on which cryptographic operations are to be performed) and forwards the data to the cryptographic hardware module on the TNIC (Step 308). Subsequently, the cryptographic hardware module performs cryptographic operations on the data using the cryptographic key (i.e., the secret key) corresponding to the cryptographic algorithm for the secure protocol data (Step 310). More specifically, the inputs for the cryptographic algorithm performed to decrypt the received packet data is the secure protocol data provided by the protocol offload module and the secret key. In one embodiment of the invention, the cryptographic operations performed on the secure protocol data result in decrypted data, which is subsequently forwarded to the host (Step 312).

Those skilled in the art will appreciate that if the TNIC is ejected at any time during the secure protocol connection (e.g., because the TNIC can no longer handle the offloaded secure protocol connection), then the data transfer phase of the secure protocol connection is handled by the host. Specifically, the host performs cryptographic operations on secure protocol connection data and the sent/received packets are processed via the host's TCP stack in a traditional manner. Further, if the connection is canceled by the TNIC or the kernel of the host, then the offload is likewise canceled.

Those skilled in the art will also appreciate that although FIG. 3 discusses the data transfer phase with respect to a received packet (i.e., the host receiving packet from a remote peer), the process of FIG. 3 similarly applies to the data transfer phase when the host sends data to a remote peer via the TNIC. In this case, the cryptographic operations performed by the TNIC using the secret key result in processed encrypted data, which is subsequently sent to a remote peer via a network.

Figure 4:
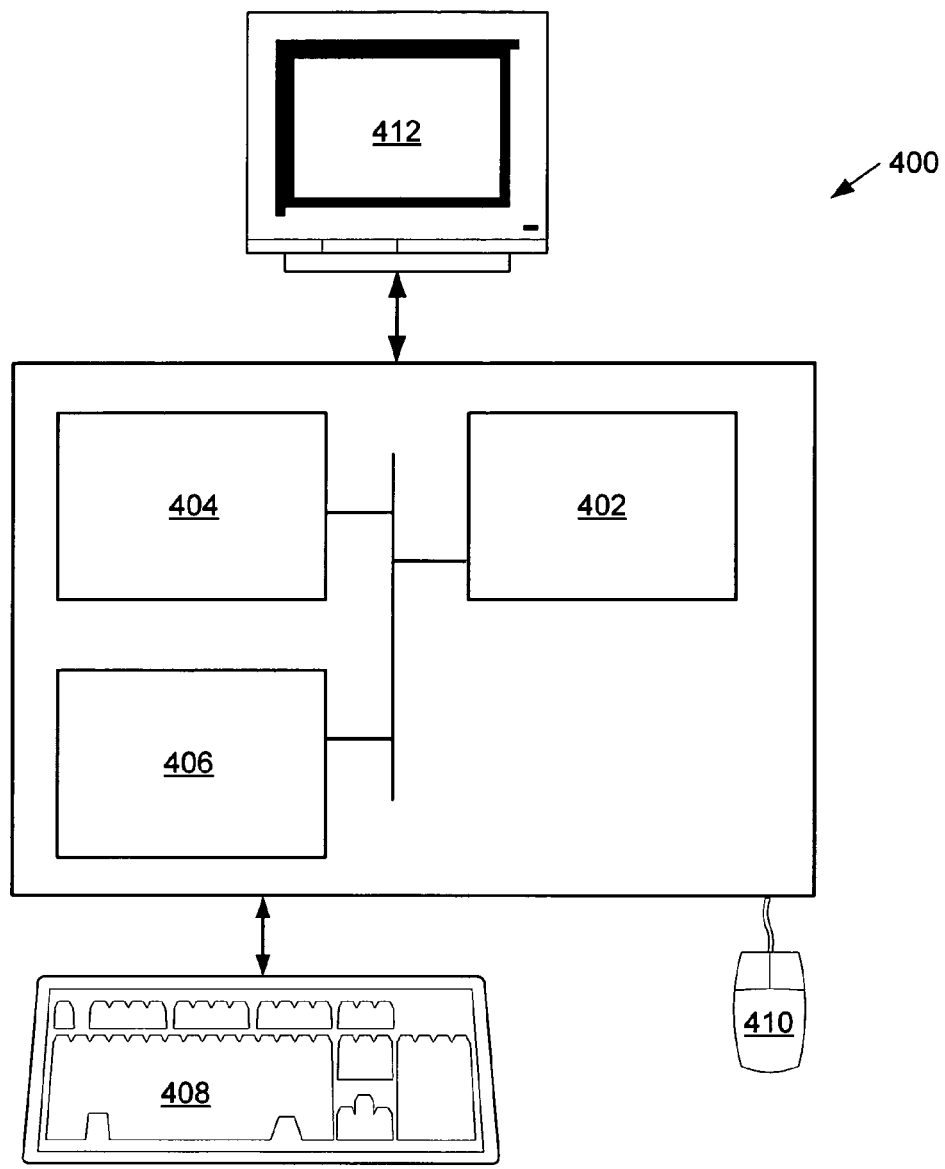
FIG. 4 shows a computer system in accordance with one embodiment of the invention.

One or more embodiments of the invention may be implemented on virtually any type of computer regardless of the platform being used. For example, as shown in FIG. 4, a networked computer system (400) includes a processor (402), associated memory (404), a storage device (406), and numerous other elements and functionalities typical of today's computers (not shown). The networked computer (400) may also include input means, such as a keyboard (408) and a mouse (410), and output means, such as a monitor (412). The networked computer system (400) is connected to a local area network (LAN) or a wide area network via a network interface connection (not shown). Those skilled in the art will appreciate that these input and output means may take other forms. Further, those skilled in the art will appreciate that one or more elements of the aforementioned computer (400) may be located at a remote location and connected to the other elements over a network. Further, software instructions to perform embodiments of the invention may be stored on a computer readable medium such as a compact disc (CD), a diskette, a tape, a file, or any other computer readable storage device.

Embodiments of the invention provide a fast method for processing of a secure protocol handshake by leveraging hardware cryptographic accelerators. Specifically, embodiments of the invention reduce system overhead by avoiding the scheduling of cryptographic requests on the host and crossing of the IO bus multiple times by offloading the secure protocol handshake to a TNIC. Further, embodiments of the invention allow the secure protocol traffic to remain visible to host applications so that operations that require access to secure protocol traffic may be performed. Moreover, if the secure protocol handshake is offloaded to the TNIC, and subsequently, the bulk encryption is also offloaded to the TNIC for the same secure protocol connection, then the secret key(s) established during the handshake phase of the secure protocol connection never have to be sent to the host. This allows the secret keys to remain more secure because the keys always reside in the TNIC.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for offloading a secure protocol handshake, comprising:
   establishing a connection between a host system and a remote peer;
   determining whether the secure protocol handshake is offloaded to a network interface card (NIC);
   if the secure protocol handshake is offloaded to the NIC:
      sending an offload request to offload the secure protocol handshake, wherein the offload request comprises a value of at least one cryptographic key;
      performing a lookup operation on a cryptographic key table using the value of at least one cryptographic key to obtain at least one secret key, wherein the NIC comprises a key store, and wherein the key store comprises the cryptographic key table;
      performing cryptographic operations associated with the secure protocol handshake using the at least one secret key; and
      returning a status of the secure protocol handshake to the host system.

2. The method of claim 1, wherein the NIC is a transport network interface card (TNIC).

3. The method of claim 1, wherein the host system performs the secure protocol handshake, if the secure protocol handshake is not offloaded to the NIC.

4. The method of claim 1, wherein determining whether the secure protocol handshake is offloaded to the NIC comprises determining whether the NIC includes sufficient resources to handle the secure protocol handshake.

5. The method of claim 1, wherein the connection between the host system and the remote peer is a TCP connection.

6. The method of claim 1, wherein cryptographic operations associated with the secure protocol handshake comprise exchanging public keys between the host system and the remote peer, resulting in the establishment of the at least one secret key.

7. The method of claim 1, further comprising:
   performing a data transfer phase, wherein cryptographic operations associated with the data transfer phase are performed by the NIC using the at least one secret key.

8. A system for offloading a secure protocol handshake, comprising:
   a host configured to:

determine whether the secure protocol handshake is offloaded to a network interface card (NIC), and if the secure protocol handshake is offloaded to the NIC:

send an offload request to offload the secure protocol handshake to a NIC, wherein the offload request comprises a value of at least one cryptographic key; and the NIC configured to:

perform a lookup operations on a cryptographic key table using the value of at least one cryptographic key to obtain at least one secret key, wherein the NIC comprises a key store, and wherein the key store comprises the cryptographic key table;

perform cryptographic operations associated with the secure protocol handshake using the at least one secret key; and return the status of the secure protocol handshake to the host system.

9. The system of claim 8, wherein the NIC is a transport network interface card (TNIC).

10. The system of claim 8, wherein the NIC comprises a protocol offload module, a cryptographic hardware module, and the key store.

11. The system of claim 10, wherein the protocol offload module is configured to process packets associated with the secure protocol handshake to determine the data on which cryptographic operations are performed.

12. The system of claim 8, wherein determining whether the secure protocol handshake is offloaded comprises determining whether the NIC includes sufficient resources to handle the secure protocol handshake.

13. The system of claim 8, wherein the NIC is further configured to process the secure protocol handshake using fast connection offloading.

14. The system of claim 8, wherein the secure protocol handshake comprises one selected from the group consisting of a secure sockets layer (SSL) handshake and a transport layer security (TLS) handshake.

15. The system of claim 8, wherein a TCP connection is established between the host and the remote peer.

16. The system of claim 8, wherein the NIC is further configured to perform a data transfer phase, wherein cryptographic operations are performed during the data transfer phase by the NIC using the at least one secret key.

17. The system of claim 16, wherein the NIC is further configured to store the at least one secret key in the cryptographic key table, and wherein the host is configured to provide the name of the at least one secret key to the NIC prior to the data transfer phase.

18. A computer system for offloading a secure protocol handshake, comprising:

a processor;

a memory;

a storage device; and software instructions stored in the memory for enabling the computer system under control of the processor, to:

establish a connection between a host system and a remote peer;

determine whether the secure protocol handshake is offloaded to a network interface card (NIC);

if the secure protocol handshake is offloaded to the NIC:

send an offload request to offload the secure protocol handshake, wherein the offload request comprises a value of at least one cryptographic key;

perform a lookup operation on a cryptographic key table using the value of at least one cryptographic key to obtain at least one secret key, wherein the NIC comprises a key store, and wherein the key store comprises the cryptographic key table;

perform cryptographic operations associated with the secure protocol handshake using the at least one secret key; and return a status of the secure protocol handshake to the host system.

* * * * *

UNITED STATES PATENT AND TRADEMARK OFFICE
CERTIFICATE OF CORRECTION

| | | |
|---|---|---|
| PATENT NO. | : 7,631,182 B1 | Page 1 of 1 |
| APPLICATION NO. | : 11/165990 | |
| DATED | : December 8, 2009 | |
| INVENTOR(S) | : Droux et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1092 days.

Signed and Sealed this

Second Day of November, 2010

David J. Kappos
*Director of the United States Patent and Trademark Office*